Gordon Lorimer McWilliam
Dennis William Dudley
Terence John Grimwood
John Berwick Holmes INVENTORS Hall, Pollock + Van de Sande, ATTORNEYS

United States Patent Office 3,443,177
Patented May 6, 1969

3,443,177
SYNCHRO CONTROL SYSTEMS AND SYNCHRO DEVICES FOR USE THEREIN
Gordon L. McWilliam, The White House, The Avenue, Churchdown, Gloucestershire, England; Dennis W. Dudley, 13 Tretawn Gardens, Tewkesbury, Gloucestershire, England; and Terence J. Grimwood, Cottesbrook, Bentham, Shurdington, Cheltenham, Gloucestershire, England; and John Berwick Holmes, 1 Auchenmaid Drive, Largs, Ayrshire, Scotland
Filed Dec. 10, 1965, Ser. No. 513,015
Claims priority, application Great Britain, Dec. 11, 1964, 50,456/64; Oct. 20, 1965, 44,430/65
Int. Cl. H02p 1/54, 5/46, 7/74
U.S. Cl. 318—18          15 Claims

ABSTRACT OF THE DISCLOSURE

A self-monitoring synchro system comprises a synchro control transformer having an energized three-phase stator and a rotor which includes a monitor winding inclined to the normal servo-nulling winding. A detector operates a warning device if the induced signal-level in the monitor winding departs from a range consistent with correct servo-nulling of the rotor. Direct current is injected in the stator-energization circuit and the detector monitors the resultant potentials at spaced circuit-points to give warning of circuit-discontinuity.

---

This invention relates to synchro control systems and synchro devices for use therein.

The invention is particularly concerned with synchro control systems, and synchro devices for use in such systems, of the kind in which a synchro device is arranged to be electrically excited in accordance with the value of a predetermined variable quantity, and control means is arranged to provide in dependence upon a signal induced in a secondary winding, or signals induced in a plurality of secondary windings, of the synchro device a controlling action for maintaining a predetermined correspondence between the value of said variable quantity and the angular disposition with respect to one another of a rotor and stator of the synchro device.

Synchro control systems of the kind specified in the preceding paragraph (hereinafter referred to as "of the kind specified") are commonly used in instrument systems where it is necessary to convey information as to the value of a variable quantity between two spaced stations, as for example where an indication provided by an instrument at one station is to be repeated at the other. Commonly, systems of the kind specified are of a form comprising a synchro control transmitter that is arranged to derive, and supply via separate lines, three electric signals that are together representative of the angular position of a rotor of the transmitter, a synchro control transformer that is arranged to receive the three signals and in accordance therewith supply a signal having a level which differs from zero in dependence upon any deviation from angular correspondence between a rotor of the transformer and the rotor of the transmitter, and an electric motor that is arranged to be energized in accordance with the signal supplied by the transformer to rotate the rotor of the transformer with respect to its stator in a sense to tend to reduce this signal to zero.

There are various faults which can arise in a synchro control system of the kind specified and which can give rise to deviation from the state in which said predetermined correspondence is maintained between the value of said variable quantity and said angular disposition with respect to one another of the rotor and stator. It is one object of the present invention to provide a synchro control system of the kind specified in which provision is made for detecting malfunction of the system.

According to one aspect of the present invention, in a synchro control system of the kind specified, the synchro device has an additional secondary winding that is carried with the aforesaid secondary winding or windings and is angularly spaced therefrom about the rotational axis of the rotor by an angle differing substantially from ninety degrees, and detector means is arranged to detect the condition in which the level of electric signal induced in the additional winding departs substantially from a predetermined reference level that differs from zero.

It may be arranged that the condition detected by the detector means is that in which the level of the signal induced in the additional secondary winding departs from a predetermined range of signal levels, said range corresponding to a small range of angular displacement of the rotor from an angular position that is appropriate to exact correspondence with the value of said variable quantity. This range of signal levels may correspond to a range extending by equal amounts, for example by two degrees, in both senses from the position of exact correspondence.

The detector means may control a warning device such that the warning device adopts a state in which it gives warning when said condition is detected by the detector means. In order that transient disturbances of the system shall not give rise to unnecessary warning, it may be arranged that the warning device is caused to adopt the warning state only in the event that said condition detected by the detector means persists for longer than a predetermined period, for example, for longer than two seconds.

The synchro device may be in the form of a synchro control transformer having three primary windings equally angularly-spaced from one another about the rotational axis of the rotor, said rotor carrying a single main secondary winding together with said additional secondary winding angularly spaced from said main secondary winding about the rotational axis. The angular spacing between the main and additional secondary windings about the rotational axis may be of, for example, fifteen or twenty degrees. From a practical standpoint, the angular spacing is preferably not more than thirty-five degrees.

The synchro control system preferably includes further detector means which is coupled to the electrical excitation circuit of the synchro device for detecting the existence of any effective discontinuity in this circuit. The further detector means may be arranged to inject a predetermined signal into the excitation circuit and to detect the condition in which a consequential signal is absent from any one of a plurality of predetermined points in said excitation circuit. Where, for example, the synchro control system includes a synchro control transmitter which has three star-connected secondary windings that are coupled by three separate lines to three star-connected primary windings respectively of a synchro control transformer, the further detector means may include means arranged to inject direct current to flow in the excitation circuit of the synchro control transformer.

It is another object of the present invention to provide a synchro device adapted for use in a system of the kind specified and for supplying a signal capable of being used in the detection of malfunction of the system. Such a synchro device, according to another aspect of the present invention, comprises: a stator; a rotor that is mounted for rotation with respect to the stator; a plurality of first electrical windings which are carried by the stator and which are angularly spaced from one another about the rotational axis of the rotor; and second and third electrical windings which are carried by the rotor and which are angularly spaced from one another about the rotational axis by an angle differing substantially from a right angle.

A synchro control system which is in accordance with the present invention, and which includes a synchro device also in accordance with the present invention, will now be described, by way of example, with reference to the accompanying drawings, in which.

Figure 1:
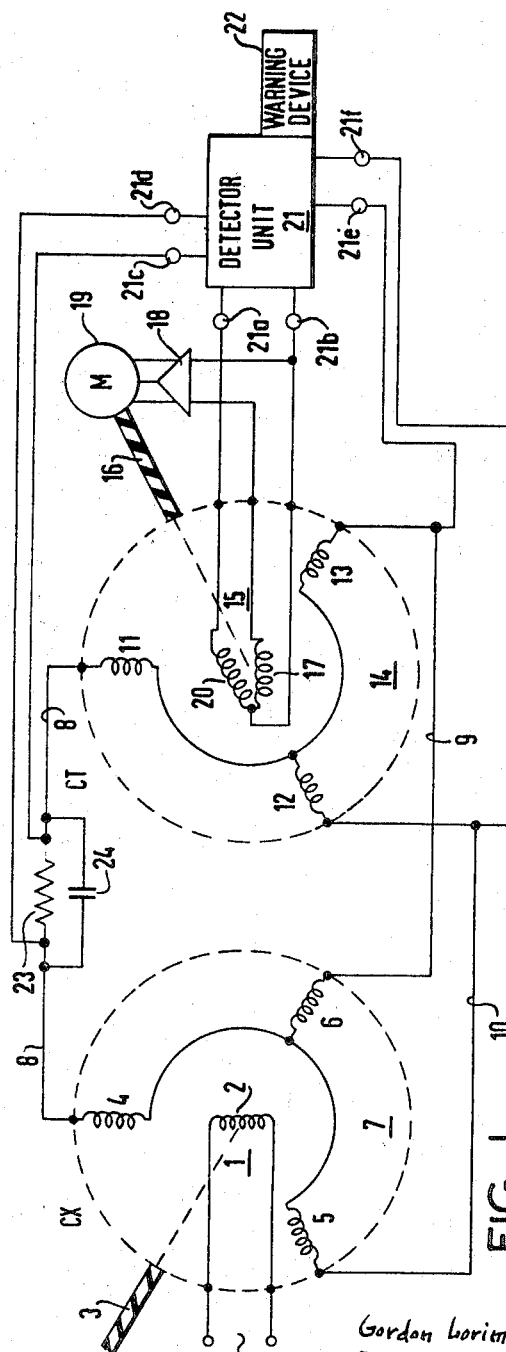
FIGURE 1 shows the circuit, partly in schematic form, of the synchro control system.

Referring to FIGURE 1, a synchro control transmitter CX has a rotor 1 which carries an electrical winding 2, and which in accordance with the angular position of an input shaft 3 of the system is angularly positioned with respect to three star-connected windings 4, 5, and 6 that are carried by the stator 7 of the transmitter CX. The windings 4, 5, and 6, which are equally angularly-spaced from one another about the rotational axis of the rotor 1, are connected via lines 8, 9, and 10 respectively to corresponding star-connected stator windings 11, 12, and 13 of a synchro control transformer CT. The transformer CT has, in addition to its stator 14 carrying the primary windings 11, 12, and 13, a rotor 15 which is coupled to a shaft 16 and which carries a secondary winding 17. Any signal induced in the rotor winding 17 during operation is applied to a servo amplifier 18 that controls energization of a servo motor 19. The servo motor 19 is coupled to the shaft 16 so as to drive the shaft 16, and thereby the rotor 15, to an angular position with respect to the stator 14 in which the induced signal is substantially zero. The shaft 16 of the transformer CT provides the output shaft of the system and is in practice coupled to an appropriate form of utilization device (not shown) to which rotation of the input shaft 3 (by some agency not shown) is to be conveyed.

As so far described, the synchro control system of FIGURE 1 is of well-known form, alternating current being in operation applied to the rotor winding 2 of the control transmitter CX with the result that the shaft 16 is driven to, and is maintained in, angular correspondence with the shaft 3. Excitation of the rotor winding 2 produces an alternating magnetic field in the stator 7 having an orientation dependent upon the angular position of the shaft 3, and the signals which as a result of this field are induced in the stator windings 4, 5, and 6 are dependent in magnitude and sense upon this angular position. These signals as applied to excite the stator windings 11, 12, and 13 of the control transformer CT together produce in the stator 14 an alternating magnetic field having an orientation with respect to the windings 11, 12, and 13 that is the same as the orientation with respect to the windings 4, 5, and 6 of the field produced by the excited winding 2. The signal induced in the rotor winding 17 is of zero amplitude only when the winding 17 is at right angles to the field in the stator 14, and it is towards this particular condition that the rotor 15 is driven by the motor 19 in maintaining angular correspondence between the input and output shafts 3 and 16.

There are various faults that can arise in the synchro control system and can give rise to deviation of the output shaft 16 from angular correspondence with the input shaft 3, and it is with the object of detecting the existence of any such fault that the rotor 15 of the control transformer CT is provided with an additional winding 20 angularly displaced by fifteen degrees from the winding 17. When, in the absence of any fault condition, the shaft 16 is in exact angular correspondence with the input shaft 3, a signal of finite amplitude level is induced in the winding 20 because of the displacement of this winding 20 from the null-position occupied by the winding 17. Any variation in the angular position of the output shaft 16 from exact angular correspondence with the input shaft 3 produces variation in the amplitude of the induced signal away from the level applicable to exact correspondence.

The signal induced in the winding 20 is supplied across terminals 21a and 21b of a detector unit 21 which is responsive to the amplitude level of this signal for controlling energization of a warning device 22. The detector unit 21 supplies energization current to the warning device 22 only if the amplitude of the signal supplied from the winding 20 lies within a predetermined range corresponding to variation of the angular position up to two degrees on either side of the position of exact correspondence. The unit 21 does not supply current to the warning device 22 for any amplitude level outside this "acceptance" range, and when not energized the warning device 22 appropriately gives warning of malfunction of the system. The warning device 22 may be of simple construction and may, for example, be provided by a moving-coil movement bearing a warning flag, the flag being held out of view against the action of a spring-bias while the moving-coil is energized, but being brought positively into view under the action of the bias when energization ceases.

The system as so far described is capable of detecting and giving warning of malfunction arising from any of a large number of varied fault conditions. In general, the occurrence of a fault condition causes the signal induced in the rotor winding 20 to increase or decrease out of the acceptane range of the detector unit 21, with the result that energization of the warning device 22 ceases so that the appropriate warning is given. There are, however, special circumstances under which the system in the form as so far described may be found to detect a certain fault condition with inadequate sensitivity. The fault condition involved is that in which there is complete or partial loss of signal-communication via one of the three lines 8, 9, and 10, and it is with the object of ensuring that this fault condition is always detected with a high degree of sensitivity irrespective of the existence of the special circumstances, that in the present example provision is made for independent monitoring of the common stator circuit of the transmitter CX and transformer CT.

The independent monitoring of the common stator circuit involves the injection of a unidirectional signal into the circuit. To this end, a resistor 23 is connected in one, in this example line 8, of the three lines 8, 9, and 10, and a unidirectional voltage of substantially constant value is supplied across the resistor 23 from a pair of supply terminals 21c and 21d of the detector unit 21. A capacitor 24 is connected in shunt with the resistor 23 to provide a by-pass for alternating current flowing in the line 8. The other two lines, lines 9 and 10, are connected respectively to a further pair of input terminals, terminals 21e and 21f, of the unit 21. In addition to breaking the supply of energization current to the warning device 22 in the event that the amplitude level applied across the terminals 21a and 21b passes from the acceptance range, the detector unit 21 also acts in the present system to break the supply of this energization current in the event that the potential with respect to terminal 21c of either, or both, of the terminals 21e and 21f changes by more than a predetermined, small amount from a predetermined, normal value. Any fault therefore, which results in one, or both, of these events produces a warning of malfunction.

Considering now the operation of the system as a whole, there are four main fault conditions that can give rise to malfunction. Firstly, there may be complete or partial loss of energization of the control transmitter CX owing to a fault in the supply circuit to the rotor winding 2, or a fault in the winding 2 itself. In the circumstances where there is a complete loss of energization no signal is induced in the rotor winding 20, and since zero-signal level lies outside the acceptance range of the detector unit 21 energization of the warning device 22 ceases, thereby giving warning of a fault condition. The zero-signal level lies clearly outside the acceptance range since it is the level which in normal circumstances would arise in the winding 20 only if the shaft 16 were to be displaced by some fifteen degrees in one sense from exact angular correspondence with the input shaft 3. Similar considerations apply where there is substantial, but not complete, loss of energization since the induced signal level aagin lies outside the acceptance range and the consequent break in energization of the warning device 22 produces the required warning.

A second condition that can give rise to malfunction of the system is that in which there is complete or partial loss of signal-communication between stator windings 4, 5, and 6 of the control transmitter CX and the stator windings 11, 12, and 13 of the control transformer CT. This condition may arise from faults in one or more of the two sets of stator windings themselves, or in one or more of the lines 8, 9, and 10. In the event of a complete loss of signal-communication there is no signal induced in the winding 20, so warning is given as before, and this applies irrespective of whether the fault also gives rise to change in the unidirectional voltage, with respect to the terminal 21c, on lines 9 and 10 sufficient independently to produce a warning. The detection of such change in voltage is of importance however, in certain circumstances where there is only partial loss of signal-communication between the two sets of stator windings.

In general, a partial loss of signal-communication between the two sets of stator windings results in change in orientation of the magnetic field in the stator 14. This produces a signal in the winding 17, and the shaft 16 is in general driven out of correspondence with the shaft 3 under the normal action of the amplifier 18 and motor 19 to restore the null-condition. In spite of any restoration of the null-condition the level of signal induced in the winding 20 in general falls to a value substantially less than that which obtains normally, since the partial loss of communication inevitably brings with it reduction in the level of excitation of the stator 14. Under these circumstances therefore, energization of the warning device 22 ceases and the required warning is given.

However, the above generally-applicable considerations do not necessarily apply in certain special circumstances where there is partial loss of signal-communication between the two sets of stator windings. These special circumstances arise in the event that there is loss of signal-communication from only one of the stator windings 4, 5, and 6 to the control transformer CT when the input shaft 3 is so positioned that the magnetic field produced in the stator 7 by the winding 2 is at right-angles, or within a few degrees of being at right-angles, to that particular stator winding. The level of signal induced in the winding 20 in these circumstances does not deviate from the acceptance range when the loss of signal-communication takes place, and may remain within this range throughout a substantial range of rotation of the shaft 3 from the position of angular correspondence with the shaft 16. In these special circumstances therefore, the existence of the fault is not readily detectable with the desired degree of sensitivity, by reference simply to the level of the signal induced in the winding 20. Additionally, even where these special circumstances do not apply initially, subsequent rotation of the shaft 3 may establish them, and thus, even though the fault is initially detectable by reference to the level of the induced signal, continuity of the detected condition in this respect, may not be maintained. In all cases however, where there is a break in signal-communication between one of the stator windings, 4, 5, and 6 and the windings 11, 12, and 13, the present system gives, and maintains, warning of the fault condition by detecting the consequent change in unidirectional voltage between the terminal 21c and either, or both, of the terminals 21e and 21f.

When there is no fault in the system, the direct current injected into the line 8 at the resistor 23 causes both lines 9 and 10 to assume the same potential (as regards direct current) with respect to the common reference level at the terminal 21c. The two lines 9 and 10, in this respect, are included at corresponding positions in two equivalent parallel-paths for the direct current. The current supplied from the unit 21, in addition to flowing through the resistor 23, flows to these two parallel-paths via the winding 11 and is returned from them via the winding 4, the potential of the terminal 21d being negative with respect to the reference level at the terminal 21c. Between the windings 11 and 4, one of the two parallel-paths extends successively through the winding 13, the line 9, and the winding 6, whereas the other extends successively through the winding 12, the line 10, and the winding 5. The windings 12 and 13 are of equal resistance, as are the windings 5 and 6, and accordingly there is substantially no potential difference between the lines 9 and 10 as regards direct current, so that the same, normal, level of unidirectional voltage with respect to the terminal 21c is applied to each terminal 21e and 21f.

In the event of an effective discontinuity in any part of the circuit through the two sets of stator windings, there is change from the normal level in either or both of the unidirectional voltages applied to the terminals 21e and 21f. If, in this respect, there is a break in either of the parallel-paths including the lines 9 and 10 respectively, the unidirectional voltage (with respect to the terminal 21c) applied to the terminal 21e or 21f associated with the faulty path, increases or decreases according to whether the break in this path is to one side or the other of the connection to the relevant terminal. On the other hand, if there is a break in the line 8 or one or other of the windings 4 and 11, the unidirectional voltages with respect to the terminal 21c that are applied to both terminals 21e and 21f increase or decrease in the same manner. In both cases the change in voltage level takes place irrespective of the angular disposition of the input shaft 3, and the detector unit 21, which detects change in either sense from the normal level of either or both of the unidirectional voltages applied to the terminals 21e and 21f, accordingly breaks the supply of energization current to the warning device 22, so as to give the required warning of the fault.

A third fault condition that can arise is that in which either or both of the two rotor windings 17 and 20 become open-circuit. In the event that the winding 20 becomes open-circuit the consequent application of zero-signal level to the unit 21 causes warning to be given. If the winding 17 only, becomes open-circuit when in the null-position a substantial change in the level of signal induced in the winding 20 and sufficient to produce warning of the fault does not arise until rotation of the shaft 3— not followed by the shaft 16 because of the fault— causes the shaft 16 to be more than two degrees out of angular correspondence with the shaft 3. However, of course, it is not until there is such displacement out of angular correspondence that the fault condition becomes effective.

Finally, it may be that although none of the previously-mentioned faults exist, the shafts 3 and 16 are not in angular correspondence. This may arise, for example, owing to overloading of the shaft 16 or to a fault in the servo amplifier 18 or motor 19. In any such case where the error is greater than two degrees, the signal induced in the winding 20 has a level outside the acceptance range and the consequent break in energization of the device 22 produces the appropriate warning.

With the above system there is the particular advantage that the monitoring of the conventional synchro-arrangement is provided without any but negligible effect on its normal operation (for example, as regards accuracy), and without the need to add greatly to its weight or bulk.

Normal transients that arise in the system and cause the induced signal level in the winding 20 to pass temporarily out of the acceptance range, no not produce a warning indication. In this respect, the detector unit 21 breaks supply of energization current to the device 22 only if the induced signal level remains outside the acceptance range for a period of, for example, two seconds. Furthermore, the induced signal is balanced in the detector unit 21 against a reference signal derived from the same power supply as supplies the energization current to the control transmitter CX, so that variations in this power supply have minimum effect.

The construction of the detector unit 21 will now be described in greater detail with reference to FIGURE 2.

Figure 2:
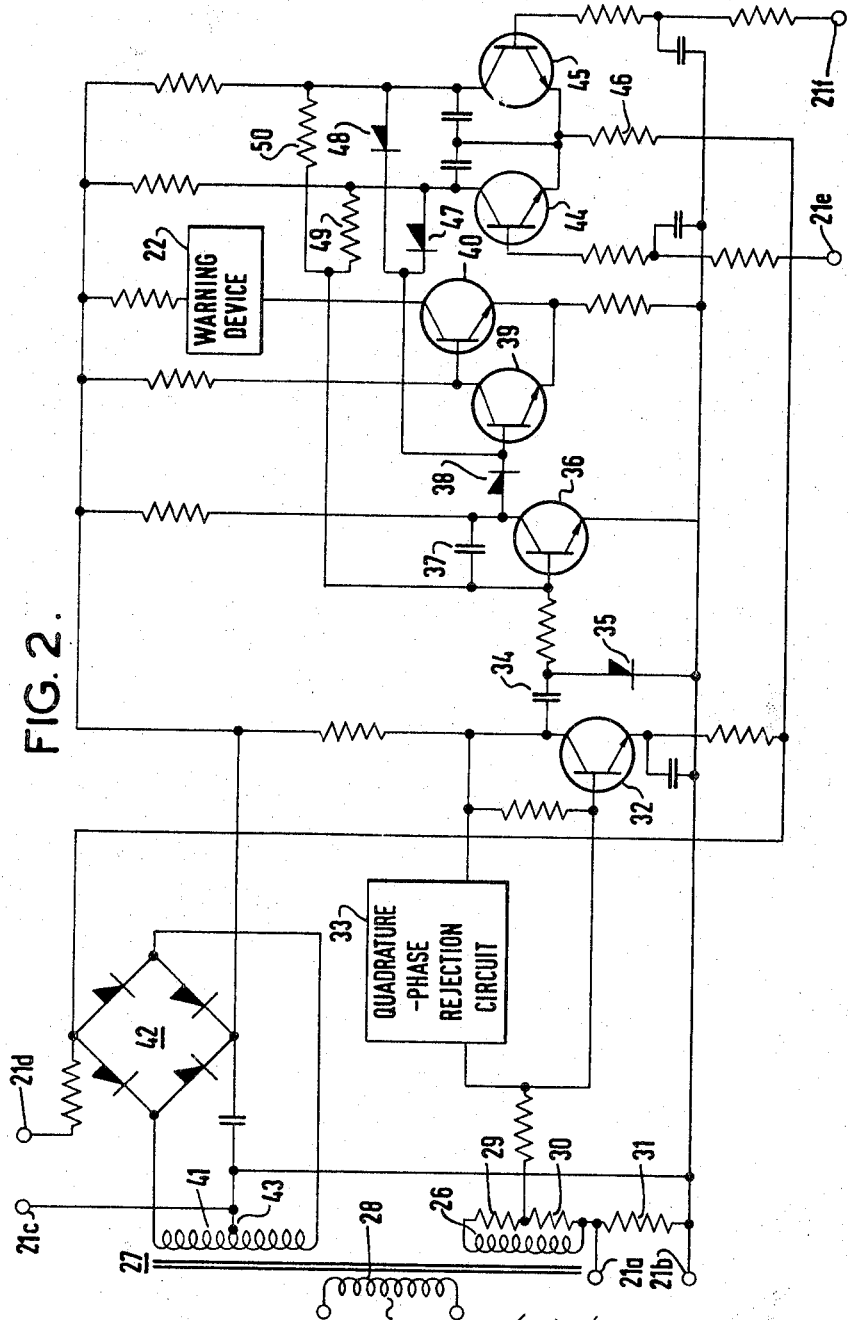
FIGURE 2 shows the circuit of a detector unit of the system of FIGURE 1.

Referring to FIGURE 2, the voltage induced in the winding 20 is applied between the input terminals 21a and 21b of the detector unit 21 to be balanced against voltage induced in a secondary winding 26 of a transformer 27. The transformer 27 has a primary winding 28 that is supplied with alternating current derived from the same power supply as provides energization of the control transmitter CX (FIGURE 1). Thus there is a substantially constant phase relationship between the signals induced in the windings 20 and 26, the signal in the winding 20 in fact leading the signal in the winding 26.

The voltage induced in the winding 26 is applied across two serially-interconnected resistors 29 and 30 to oppose the voltage from the terminals 21a and 21b applied across a resistor 31 connected to the resistor 30. Any resultant signal appearing across the resistors 30 and 31 is applied to the base electrode of an N-P-N junction transistor 32. In view of the phase-lead of the voltage applied across the resistor 31, the resultant signal has two components one of which is in anti-phase with the signal applied across the resistors 29 and 30 and the other of which is in phase quadrature therewith. This latter component is rejected by means of a quadrature-phase rejection circuit 33 that is connected in a negative-feedback path between the collector- and base-circuits of the transistor 32.

The amplified signal appearing at the collector electrode of the transistor 32 is applied via a capacitor 34 across a rectifier 35 and thence to the base electrode of an N-P-N junction transistor 36 which is normally fully conductive. If the in-phase component of the signal applied to the transistor 32 signifies that the level of the signal induced in the winding 20 lies outside the acceptance range, the resultant signal at the collector electrode of the transistor 32 (as passed via the capacitor 34 and direct-current restored by the rectifier 35 to a negative-going form) causes the transistor 36 to become non-conductive. A capacitor 37 connected between the collector and base electrodes of the transistor 36 acts to delay (for example, for two seconds) the response of the transistor 36 in this respect, the time constant of charge of the capacitor 37 being long compared with the periodic time of the supply current.

The collector electrode of the transistor 36 is connected via a rectifier 38 to the base electrode of an N-P-N junction transistor 39 that, together with the rectifier 38, is normally non-conductive. The transistor 39 controls conduction of an N-P-N junction transistor 40 through which energization current for the warning device 22 is passed. While the transistor 39 is non-conductive the transistor 40 is fully conductive to maintain the warning device 22 energized. However, when the transistor 36 becomes non-conductive in response to the condition in which the level of the signal induced in the winding 20 lies outside the acceptance range, the rectifier 38, and with it the transistor 39, becomes conductive. Conduction of the transistor 39 renders the transistor 40 non-conductive, thereby breaking the supply of energization current to the warning device 22 and giving warning, as required.

The unidirectional voltage that is supplied by the unit 21 across its terminals 21c and 21d is derived from a center-tapped secondary winding 41 of the transformer 27. Alternating voltage induced in the winding 41 from the primary winding 28 is applied to a full-wave bridge rectifier 42 to produce, with respect to the center-tap 43 of the winding 41, "positive" and "negative" supply voltages. The "negative" supply voltage is supplied across the terminals 21c and 21d, with the terminal 21c connected directly to the center-tap 43. The "positive" and the "negative" supply voltages are both applied in the power supply circuits of the transistors 32, 36, 39, and 40, and also in the power supply circuits of two further N-P-N junction transistors 44 and 45 included in the detector unit 21.

The transistors 44 and 45 have their base electrodes connected to receive the signals applied to the terminals 21e and 21f, and, being interconnected as a long-tailed pair, have a common emitter-load resistor 46. The collector electrodes of the transistors 44 and 45 are connected respectively via rectifiers 47 and 48 to the base electrode of the transistor 39, and are also connected respectively via resistors 49 and 50 to the base electrode of the transistor 36. In normal circumstances, the two transistors 44 and 45 are conductive, but if the voltage appearing between the terminal 21c and either terminal 21e and 21f increases (so that the terminal 21e or 21f becomes more negative with respect to the terminal 21c) or decreases from its normal value, one or the other of the transistors 44 and 45 becomes fully conductive and the other non-conductive. If the voltage increases, then the transistor 44 or 45 to which this change is applied becomes non-conductive and the other transistor fully conductive, whereas if it decreases, the reverse applies. In either case one of the transistors 44 and 45 becomes non-conductive causing one of the two rectifiers 47 and 48 to become conductive. This causes the transistor 39 to conduct, and as a result the transistor 40 becomes non-conductive thereby breaking the supply of energization current to the warning device 22 so as to give appropriate warning.

If there is an increase in the voltage signal applied to both terminals 21e and 21f both transistors 44 and 45 become non-conductive and accordingly both rectifiers 47 and 48 conduct. As in the case where only one rectifier 47 and 48 conducts, the transistors 39 and 40 as a result become conductive and non-conductive respectively, so that the appropriate warning is given. If, on the other hand, the voltage signal applied to both terminals 21e and 21f decreases, both transistors 44 and 45 become fully conductive. In these circumstances the collector electrodes of the transistors 44 and 45 both tend to become negative with respect to the reference level of terminal 21c with the result that current flowing via the resistors 49 and 50 biases the normally-conductive transistor 36 to the non-conductive condition. This, in its turn, causes the transistors 39 and 40 to become conductive and non-conductive respectively, so that, again the appropriate warning is given.

Although with the synchro control transformer CT described above with reference to FIGURE 1, the additional secondary winding 20 is spaced by fifteen degrees from the normal secondary winding 17, this particular angular spacing is not critical. In general, the angular spacing is chosen to be as small as reasonably practicable, but freedom of choice in this respect is somewhat limited by the requirement that in order to be able to detect, for example, loss of energization, zero-signal level is to lie outside the acceptance range required of the detector unit 21. The spacing is desirably small in order to achieve maximum sensitivity, that is to say, maximum rate of change of induced-signal level with deviation from exact correspondence. The maximum sensitivity in this respect is that which would be obtained with zero angular spacing, however it is necessary to provide some small measure of angular spacing in order that a signal of a non-zero and readily detectable level is induced in the additional secondary winding 20 when correspondence is being maintained. It would not otherwise be possible to use the induced signal to discriminate between the condition in which the system is functioning correctly, and the condition in which, for example, there is no energization of the stator windings 11, 12, and 13 of the control transformer CT.

The angular spacing chosen in any particular case is preferably less than thirty-five degrees and is normally dictated to some extent by practical considerations of how most conveniently to accommodate the additional winding 20 on the rotor 15. In this respect, the rotor of a synchro control transformer is conventionally of slotted cylindrical form with its normal, single secondary winding distributed over a number of the slots. With the particular control transformer CT used in the specific system described above, the rotor 15 is of the form shown in FIGURE 3.

Figure 3:
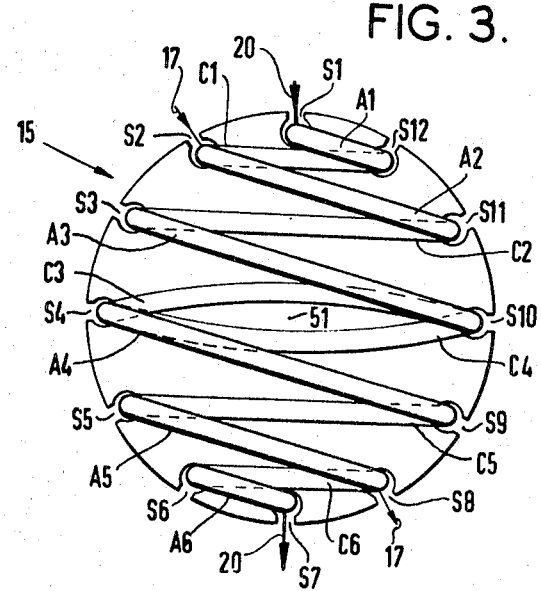
FIGURE 3 is a representative end-elevation of a rotor of the synchro device used in the synchro control system of FIGURE 1.

Referring to FIGURE 3, the cylindrical rotor 15 of the synchro control transformer CT has twelve longitudinal slots S1 to S12 angularly spaced from one another about its rotational axis 51 by thirty degrees. The winding 17 is wound on the rotor 15 to form six substantially parallel coils C1 to C6 each lying in a pair of the slots S1 to S12. The coil C1 is of eleven turns and lies in the pair of slots S2 and S12; the coil C2 is of thirty-one turns and lies in the pair of slots S3 and S11; the coils C3 and C4, which are both of forty-two turns, both lie in the pair of slots S4 and S10, but at the two ends of the rotor 15 pass on either side of the axis 51; the coil C5 is of thirty-one turns and lies in the pair of slots S5 and S9; and the coil C6 is of eleven turns and lies in the pair of slots S6 and S8. (In each case the winding 17 enters the relevant coil by the first-mentioned slot of the named pair and leaves by the second.)

The additional winding 20 is also wound on the rotor 15 to form six substantially parallel coils, coils A1 to A6, each lying within a pair of the slots S1 to S12. The coil A1 is of eleven turns and lies in the pair of slots S1 and S12; the coil A2 is of thirty-one turns and lies in the pair of slots S2 and S11; the coil A3 is of forty-two turns and lies in the pair of slots S3 and S10; the coil A4 is of forty-two turns and lies in the pair of slots S4 and S9; the coil A5 is of thirty-one turns and lies in the pair of slots S5 and S8; and the coil A6 is of eleven turns and lies in the pair of slots S6 and S7. (As before, in each case the winding 20 enters the relevant coil by the first-mentioned slot of the named pair and leaves by the second.) With the above winding arrangement, the coils A1 to A6 are inclined to the coils C1 to C6 at an angle equal to half the angle between slots S1 to S12, that is to say at an angle of fifteen degrees. The angular spacing used in this particular case is therefore dictated by the spacing of the slots in the rotor of the particular control transformer used, and where use is made of a control transformer of a different size having a rotor with a different number of slots, a different angular spacing may be dictated. For example where a rotor having only nine slots is used, the winding arrangement may be as shown in FIGURE 4.

Figure 4:
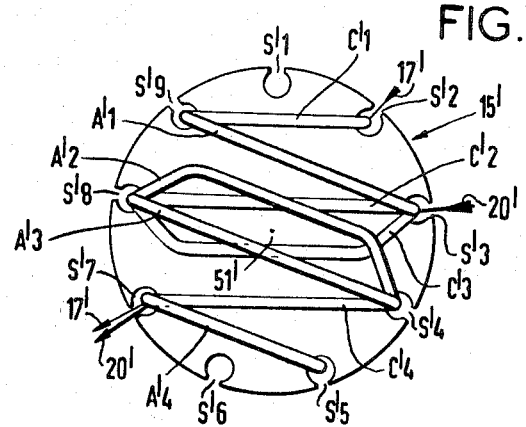
FIGURE 4 is an end-elevation, corresponding to that of FIGURE 3, of a rotor of an alternative synchro device.

Referring to FIGURE 4, the cylindrical rotor 15' in this case has nine longitudinal slots S'1 to S'9 angularly spaced from one another about its rotational axis 51' by forty degrees. The normal secondary winding 17' and the additional winding 20' are wound on the rotor 15' to form four coils C'1 to C'4 and four coils A'1 to A'4 respectively. The coil C'1 is of one hundred and twenty-eight turns and lies in the pair of slots S'2 and S'9; the coils C'2 and C'3, which are respectively of one hundred-and-eight and eighty-eight turns, both lie in the pair of slots S'3 and S'8, but at the two ends of the rotor 15' pass on either side of the axis 51'; and the coil C'4 is of one hundred and seventy-four turns and lies in the pair of slots S'4 and S'7. On the other hand, the coil A'1 is of forty-five turns and lies in the pair of slots S'3 and S'9; the coils A'2 and A'3, which are respectively of twenty-three and twenty-eight turns, both lie in the pair of slots S'4 and S'8 but pass on either side of the axis 51'; and the coil A'4 is of thirty-four turns and lies in the pair of slots S'5 and S'7. (In each case the windings 17' and 20' enter the relevant coil by the first-mentioned slot of the named pair and leave by the second.) With this winding arrangement the angular spacing between the windings 17' and 20' is twenty degrees.

Although there has been described above with reference to the drawings, a synchro control system of somewhat conventional form using a synchro control transformer having its rotor driven by a servo motor for maintaining angular correspondence between the rotor of the transformer and an associated synchro control transmitter, the invention is not limited in its application to such systems. For example, the invention is equally applicable to systems in which the rotor of the synchro control transmitter, rather than of the transformer, is driven by the servo motor for maintaining correspondence between the rotors. Additionally, it has been proposed to use in place of the synchro control transformer of the conventional form of synchro control system, a synchro having two mutually perpendicular secondary windings on its rotor, and to process signals induced in the two windings to control rotation of the rotor and achieve the same effect as in the more conventional system. The present invention is also applicable to such a system and simply involves the addition to the rotor of a third winding inclined to the other two. Similarly, the invention is equally applicable to systems of the kind in which, rather than using the conventional synchro control transformer having a three-phase stator and a single-phase rotor, a synchro device having, for example, a two-phase stator and a three-phase rotor, or a single-phase stator and a two-phase rotor, is used.

We claim:
1. In a synchro control system, which system includes a synchro device having a stator part, a rotor part mounted for angular displacement about an axis with respect to the stator part, an electrical primary winding-arrangement carried by one of the two parts, and an electrical secondary winding carried by the other part and inductively coupled to said primary winding-arrangement: an additional secondary winding carried by said other part and inductively coupled to said primary winding-arrangement, said additional secondary winding being spaced angularly about said axis from the aforesaid secondary winding by an angle differing substantially from ninety degrees, and detector means responsive to an electric signal induced in said additional secondary winding to detect the condition in which the level of said induced signal departs substantially from a predetermined reference level that differs from zero.

2. A synchro control system according to claim 1 wherein said detector means comprises means to detect the condition in which the level of said induced signal departs from a discrete range of signal levels that all differ from zero.

3. A synchro control system according to claim 1 including a controllable warning device, and means to control said warning device to adopt a warning state when said condition is detected as aforesaid by the detector means.

4. A synchro control system according to claim 3 wherein said means controlling said warning device comprises means to control said warning device to adopt said warning state only in the event that said detected condition persists for longer than a predetermined period.

5. A synchro control system according to claim 1 wherein said synchro device comprises a synchro control transformer having three primary windings that are carried by said stator part in equally angularly-spaced relation to one another about said axis.

6. A synchro control system according to claim 1 wherein said angle is not more than thirty-five degrees.

7. A synchro control system according to claim 1 including further detector means in combination with an electrical excitation circuit for said primary winding-arrangement, said further detector means being coupled to said excitation circuit to detect the existence of any effective discontinuity in said circuit.

8. A synchro control system according to claim 1 including further detector means in combination with an electrical excitation circuit for said primary winding-arrangement, said further detector means comprising means for injecting a predetermined signal into the excitation circuit, and means coupled to a plurality of points in said circuit to detect the condition in which a predetermined consequential signal is absent from at least one of said points.

9. A synchro control system comprising: a synchro device having a stator part, a rotor part mounted for angular displacement about an axis with respect to the stator part, an electrical primary winding-arrangement carried by one of the two parts, and an electrical secondary winding-arrangement carried by the other of the two parts, said secondary winding-arrangement including at least first and second secondary windings that are each inductively coupled to said primary winding-arrangement and are angularly spaced from one another about said axis by an angle differing substantially from ninety degrees; electrical excitation circuit means for exciting said primary winding-arrangement electrically in accordance with the value of a predetermined variable quantity; control means that is connected electrically to said secondary winding-arrangement for responding to at least an electric signal induced in said first secondary winding to rotate the rotor part to maintain a predetermined correspondence between the angular position of the rotor part and the value of said variable; and detector means that is responsive to an electric signal induced in said second secondary winding to detect the condition in which the level of this signal departs substantially from a predetermined reference level that differs from zero.

10. A synchro control system according to claim 9 including further detector means that is coupled electrically to said excitation circuit means for detecting the existence of any effective discontinuity therein.

11. A synchro control system according to claim 10 wherein said further detector means comprises means for injecting direct current into the excitation circuit means, and means coupled to a plurality of points in said excitation circuit means to detect the condition in which a predetermined potential level is absent from at least one of said points.

12. A synchro control system comprising: a synchro control transmitter having a stator, a rotor that is rotatable with respect to the stator, an electrical primary winding carried by said rotor, and three electrical secondary windings that are carried by the stator and are angularly-spaced from one another with respect to the rotor for deriving three electric signals that are together representative of the angular position of the rotor with respect to the stator; a synchro control transformer having a stator, a rotor that is rotatable with respect to the transformer-stator, three electrical primary windings that are carried by the stator and are angularly-spaced from one another with respect to the transformer-rotor, and a main secondary winding and an additional secondary winding that are both carried by the transformer-rotor with an angular spacing therebetween of not more than thirty-five degrees; first, second, and third signal-communication lines connecting the three secondary windings of the transmitter to the three primary windings respectively of the transformer, the first line including a resistance; servo means responsive to an electric signal induced in said main secondary winding to rotate one of said rotors to reduce this signal to zero; means for applying unidirectional voltage across said resistance; controllable warning means; first detector means for controlling the warning means to provide warning in response to the condition in which the level of an electric signal induced in said additional secondary winding departs from a predetermined range of signal levels that all differ from zero; and second detector means connected to two points in said second and third lines for controlling the warning means to give warning also in response to the condition in which there is change from a predetermined potential level at at least one of said points.

13. A synchro device comprising: a stator; a rotor mounted for rotation about an axis with respect to said stator; a plurality of first electrical windings carried by said stator and angularly spaced from one another about said axis; second and third electrical windings carried by said rotor, said second and third windings each comprising a set of discrete and parallel coils; and means mounting said second and third windings on said rotor with the set of coils of said third winding angularly spaced about said axis from the set of coils of said second winding by an angle not more than thirty-five degrees.

14. A synchro device according to claim 13 wherein said angle is fifteen degrees.

15. A synchro device according to claim 13 wherein said angle is twenty degrees.

References Cited

UNITED STATES PATENTS

| | | | |
|---|---|---|---|
| 1,964,229 | 6/1934 | Tanner | 336—120 |
| 3,111,613 | 11/1963 | Harper et al. | 318—24 |
| 3,131,350 | 4/1964 | Canaday et al. | 318—24 XR |
| 3,184,628 | 5/1965 | Hammerstrom et al. | 310—210 XR |
| 3,244,961 | 4/1966 | Adler | 318—30 XR |
| 3,359,627 | 12/1967 | Emerson et al. | 336—120 XR |

BENJAMIN DOBECK, *Primary Examiner.*

U.S. Cl. X.R.

318—24, 336—120